United States Patent
Oliver et al.

(10) Patent No.: US 6,407,484 B1
(45) Date of Patent: Jun. 18, 2002

(54) PIEZOELECTRIC ENERGY HARVESTER AND METHOD

(75) Inventors: John R. Oliver, Newbury Park; Ratnakar R. Neurgaonkar; Alex P. Moffatt, both of Thousand Oaks; Mohsen Khoshnevisan, Newbury Park; Jeffrey Glenn Nelson, Camarillo, all of CA (US)

(73) Assignee: Rockwell Technologies Inc, Thousand Oaks, CA (US)

( * ) Notice: Subject to any disclaimer, the term of this patent is extended or adjusted under 35 U.S.C. 154(b) by 62 days.

(21) Appl. No.: 09/676,137

(22) Filed: Sep. 29, 2000

(51) Int. Cl.[7] .............................................. H01L 41/04
(52) U.S. Cl. ...................................................... 310/339
(58) Field of Search ................................... 310/339, 338

(56) References Cited

U.S. PATENT DOCUMENTS

| | | | |
|---|---|---|---|
| 3,890,941 A | 6/1975 | Paul, Jr. .................... 123/44 R |
| 4,091,302 A | 5/1978 | Yamashita ................... 310/339 |
| 4,277,690 A | 7/1981 | Noren ........................... 290/53 |
| 4,952,836 A | 8/1990 | Robertson .................... 310/339 |
| 4,999,819 A | 3/1991 | Newham et al. ............. 367/157 |
| 5,276,657 A | 1/1994 | Newham et al. ............. 367/157 |
| 5,512,795 A | 4/1996 | Epstein et al. ............... 310/339 |
| 5,595,677 A | 1/1997 | Neurgaonkar et al. ...... 252/62.9 |
| 5,729,077 A | 3/1998 | Newnham et al. ........... 310/328 |
| 5,751,091 A | 5/1998 | Takahashi et al. ........... 310/339 |
| 5,835,996 A | 11/1998 | Hashimoto et al. ......... 323/364 |
| 5,934,882 A | 8/1999 | Olney et al. ................. 417/233 |

OTHER PUBLICATIONS

Tressler et al, Capped Ceramic Hydrophones. Jun. 1995. IEEE Ultrasonics Symposium. vol. 2. pp. 897–900.*

Tressler et al, Cermic–Metal Composite Transducers for Underwater Acoustic Applications Proceedings of the Tenth IEEE International Symposium on Applications of Ferroelectrics, 1996. vol. 2. pp. 561–564.*

* cited by examiner

Primary Examiner—Nestor Ramirez
Assistant Examiner—Peter Medley
(74) Attorney, Agent, or Firm—Koppel, Jacobs, Patrick & Keybl (57) ABSTRACT

A self contained device for harvesting electrical energy from linear and rotary motion has a sensor with amplifiers for tensile stretching of a piezoelectric body with magnification of the applied force. The piezoelectric body is a monolithic plate with surface electrodes covering its top and bottom surfaces.

38 Claims, 11 Drawing Sheets

PIEZOELECTRIC ENERGY HARVESTER AND METHOD

BACKGROUND OF THE INVENTION

1. Field of the Invention

The present invention relates to piezoelectric sensors and energy harvesters.

2. Description of the Related Art

Piezoelectric sensors have been used in energy harvesters (also called generators) and other applications. Typical types of sensors used in such applications include bimorph-type and multi-layered devices.

Bimorph sensors produce a voltage in response to the application of a bending force. These sensors have been used in energy harvesters (see Olney, U.S. Pat. No. 5,934,882). However, in such devices the energy that can be harvested is limited to the applied force. Additionally, bending causes fatigue of the piezoelectric material, thus shortening its lifetime.

Multi-layered piezoelectric stacks are also used in energy harvesters (see Olney). In such devices a direct force, orthogonal to the major surfaces of the piezoelectric stacks, is applied to compress the stack.

Again, the energy that can be harvested is limited to the applied force.

U.S. Pat no. 5,729,077 discloses a structure for an actuator which has amplifiers on opposing major surfaces of a piezoelectric substrate. Piezoelectric actuators and sensors have similar structures, with actuators used to generate a displacement force from an applied voltage, rather than to generate a voltage from an applied force as in a sensor. The structure disclosed in the '077 patent can be used in a sensor embodiment, where force applied to the amplifiers causes a tensile stress in the piezoelectric substrate.

The '077 patent teaches interdigitated input and output electrodes within a multilayered piezoelectric body. The electrodes are not continuous along the length of the device, but rather are connected to conductors at one edge and terminate internally without connecting to the opposite edge.

The multilayered structure reduces the voltage required to produce a given displacement because the relatively short distance between successive electrodes produces a relatively high electric field for a given voltage differential between the electrodes. However, in the sensor embodiment, the multi-layered structure has a relatively low voltage output per unit of applied force and a relatively higher internal capacitance, and is more costly to construct. Moreover, the device has a relatively low tensile stress tolerance.

SUMMARY OF THE INVENTION

The new energy harvester comprises at least one sensor having a piezoelectric plate with its polarization orthogonal to its major surfaces, throughout the length of the plate. When a tensile force is applied to either stretch or compress the plate along its length, the piezoelectric material produces an electric charge via the direct $d_{31}$ piezoelectric effect.

The sensor has a force amplifier that translates a perpendicular force into an amplified tensile force along the length of the plate. Due to the magnification of the applied force, the sensor produces a high energy and voltage output in response to relatively small forces.

Additionally, the sensor has electrodes only on the opposite major surfaces of the piezoelectric plate, covering the entire surfaces. The piezoelectric plate's monolithic structure and electrode configuration contribute to the sensor's high output voltage per applied force. Additionally, the sensor has a reduced internal capacitance, is relatively low cost, and can withstand a high tensile stress.

One embodiment of the new harvester employs a lever arm that reciprocates between a pair of the piezoelectric sensors to place alternating compressive tensile stresses on the sensors, thus converting mechanical work into electrical energy. This device can be tuned to operate at a particular frequency. With a mass placed on the lever arm, giving the mass an alternating motion produces the required reciprocation of the lever arm. In another embodiment a mass held between two sensors, which similarly imparts alternating compressive stresses on the sensors as the mass vibrates.

Further features and advantages of the invention will be apparent to those skilled in the art from the following detailed description, taken together with the accompanying drawings.

DETAILED DESCRIPTION OF THE INVENTION

Definitions

The following definitions apply to this disclosure: 1. The term "tensile stress" includes stress caused by stretching or compressing (i.e. positive or negative tensile stress) in a direction parallel to the plane of the piezoelectric plate. 2. The term "mass" includes a plurality of bodies and is not limited to a single body.

The following figures illustrating various embodiments of the present invention are not to scale.

Figure 1:
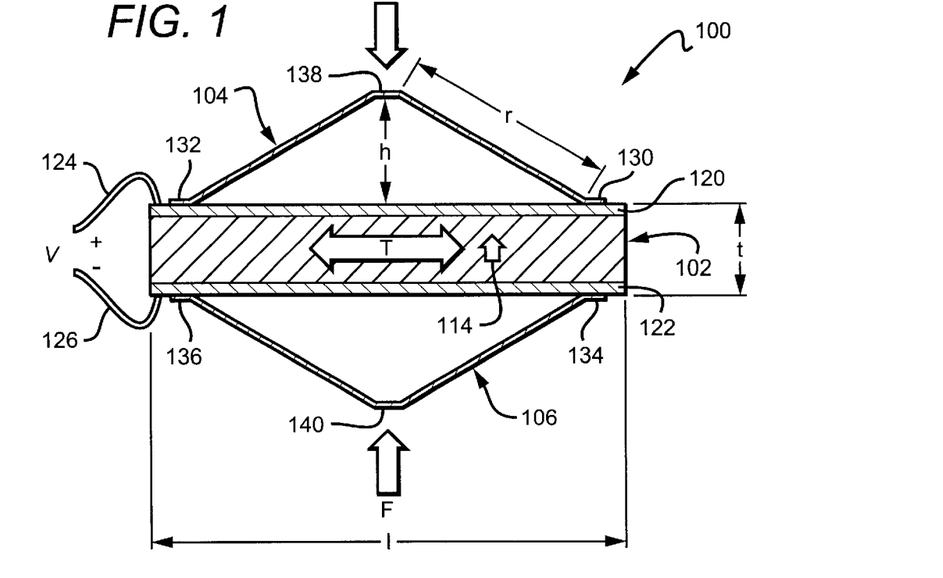
FIG. 1 is a sectional view of a piezoelectric sensor in accordance with the present invention.
Figure 2:
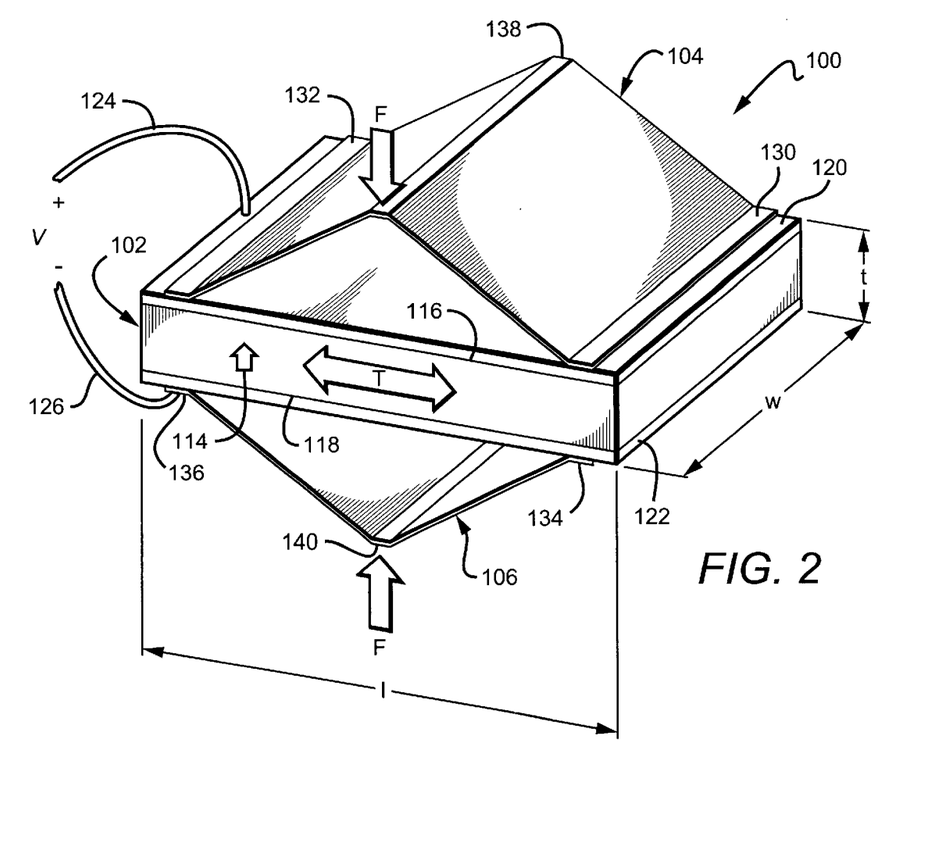
FIG. 2 is a perspective view of the piezoelectric sensor of FIG. 1.

FIGS. 1 and 2 illustrate a piezoelectric sensor 100 which comprises a plate 102 of piezoelectric material and two force amplifiers 104, 106, which have similar geometries and are bonded on opposite surfaces of the plate 102.

Figure 3:
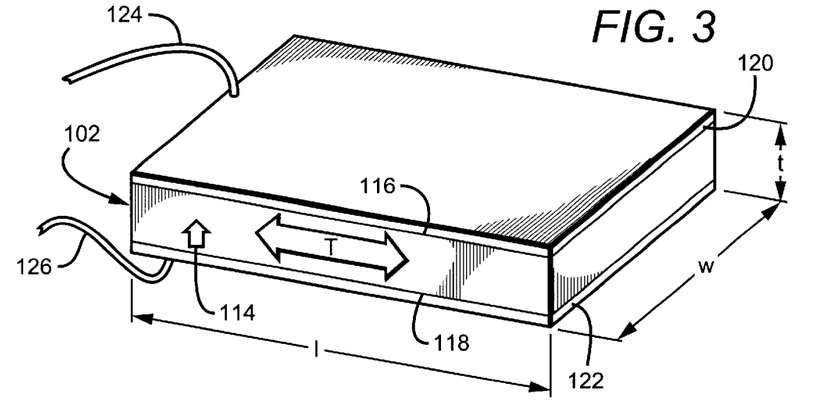
FIG. 3 is a perspective view of a piezoelectric plate used in the sensor of FIG. 1.

The plate 102, illustrated separately in FIG. 3, is preferably rectangular, having a thickness "t", a width "w", and a length "l", with a polarization along its thickness as indicated by the arrow 114.

Opposite major surfaces 116, 118 of the plate 102 have electrode coatings 120, 122 covering substantially their entire areas. Leads 124, 126 are bonded to each of the electrodes 120, 122 for obtaining an output signal. The leads may be provided at any convenient locations on the electrodes 120, 122, and are preferably bonded to the electrodes with a conductive epoxy such as "Ecobond 56c" (manufactured by EV Roberts Company).

When the plate 102 is stretched or compressed along its length 112, a tension "T" in the same direction results. This tension produces a voltage across the major surfaces 116, 118, via the direct piezoelectric $d_{31}$ effect, which can be stored in a capacitor or battery. The polarization of the output voltage for positive tensile stress is determined by the direction of polarization of the plate 102, as indicated by the arrow 114.

To assist in stretching or compressing the plate 102 longitudinally, force amplifiers 104 and 106 are bonded to the opposite ends of the electrodes 120 and 122, respectively. The force amplifiers 104, 106 are bonded to the electrodes at their ends 130, 132, 134, 136 and elevated at their centers 138, 140. A mechanical force "F", applied at the elevated centers 138, 140 of the amplifiers 104, 106, and in a direction orthogonal to the plate's surfaces 116, 118, is translated into a mechanical tension "T" along the length 112 of the plate 102.

The amplifiers 104, 106 each comprise a sheet of a stiff material such as aluminum or stainless steel, although a metal is not required. The amplifiers 104, 106 approximately form a triangular geometry with their respective electrodes 120, 122 as the base. The centers 138, 140, of the sheets are bent and elevated by a height "h" above the electrodes 120, 122. The sheet halves on opposite sides of the folded centers each extended a distance "r" to their respective bonds to the electrodes to form the side legs of the "triangles". The ratio h/r is preferably small to maximize the amplification and increase the tensile component of the force parallel to the plate 102. However, the ratio should not be so small that the amplifier centers bottom out on the electrodes when force is applied. An estimated lower limit for the ratio is approximately 1/50. The width of the amplifiers 104, 106 preferably matches the width 110 of the plate 102 and electrodes 120, 122 so that the force is uniformly spread along the width of the plate 102. Each amplifier sheet can be either continuous or formed from two separate sheets coupled together at a bend.

Instead of a thin sheet the force amplifiers can be formed from narrower struts connected together at one end by a pivot and at their opposite ends to bars which extend across the width of the electrode. Other mechanical mechanisms to translate a perpendicular force to a tensile stress on the plate can also be envisioned, including connecting the force amplifier directly to the opposite exposed ends of the piezoelectric plate, rather than indirectly to the plate through an electrode.

A short segment of each of the ends 130, 132, 134, 136 of the amplifiers 104, 106 is flattened for bonding to the electrodes 120, 122 close to their outer edges, so that the amplifiers 104, 106 can stretch the entire plate. The bond should be strong with a contact area that is as short as possible, to minimize sheering of the bond and interference when the plate 102 stretches. A non-conducting epoxy such as "Hysol- EA9395" (manufactured by Dexter Hysol Aerospace) is preferable for preventing current leakage between the plate and amplifiers and producing a strong bond. The elevated centers 138, 140 of the amplifiers 104, 106 have a small flat area as illustrated in the figure, for receiving the applied force 142.

The sensor 100 may have only one amplifier instead of two, however, the bottom surface would have to be supported by another flat surface, and friction as the sensor is loaded would diminish the output and ultimately also limit the device lifetime due to wear.

The sensor 100 is constructed by cutting out the piezoelectric plate, coating it with metal electrodes by a process such as sputtered deposition, poling the plate along its length, and metal stamping the amplifiers for bonding to the plate. The piezoelectric plate is poled to a uniform polarization direction by the application of a high voltage (approximately 1000 to 3000 Volts for a 1 mm thick material); Poling techniques are described in B. Jaffe, W. R. Cook, and H. Jaffe, "Piezoelectric ceramics," (Academic Press, N.Y., 1971), pg. 16.

The parameters of a working model for a sensor with a deaf of 553,000 pC/N, and a pair of opposed amplifiers with an h/r ratio of 0.0667 (h=1 mm, r=15 mm) according to FIGS. 1–3, are listed in table I:

TABLE I

Parameters for a Piezoelectric Sensor.

| | Plate | Amplifiers |
|---|---|---|
| Material | PZLT[†], with Platinum electrodes | Aluminum |
| Length (mm) | 40 | 36 |
| Width (mm) | 12.5 | 10 |
| Thickness (mm) | 0.48 | 0.39 |

[†]Described in U.S. Pat. No. 5,595,677.

For a force $\Delta F$ applied to the amplifiers of a sensor as illustrated in FIGS. 1 and 2, the charge $\Delta Q$ (in coulombs) is approximately described by:

$$\Delta Q \cong d_{\mathit{eff}}(\Delta F), \tag{Eq. 1}$$

where $$d_{eff} \cong (rl/ht)d_{31} \quad \text{(Eq. 2)}$$

From Eqs. 1–3 it can be seen that maximizing r and l while minimizing t and h maximizes the output charge Q.

For a device capacitance "C", the generated electrical energy "E" is approximated by:

$$E \cong \tfrac{1}{2}(\Delta Q^2/C), \text{ or} \quad \text{(Eq. 3)}$$

$$E \cong (d_{eff}\Delta F)^2/2C. \quad \text{(Eq. 4)}$$

The gain in energy over a conventional piezoelectric sensor is approximately $(rl/2ht)^2$. This gain is due to the lever arm magnification of the applied force. Although the amplifiers are designed to stretch the plate along its length, it would also be possible to compress the plate along its length by pulling outwardly on the amplifiers, although this would risk bending of the plate.

Due to the limitations in strength of piezoelectric materials, there is an upper limit at which the material will not be able to handle the tensile stress and will break. For PLZT piezoelectric ceramics (described in U.S. Pat. No. 5,595,677) the maximum energy density which the device can handle is approximately 7 mJ/cm$^3$. The maximum output voltage for a PLZT-9 of thickness t in cm is approximately 6000t Volts. The maximum observed $d_{eff}$ for a material having a $d_{31}$ of 400 pC/N is $1.03 \times 10^6$ pC/N, which is a gain of 2570 over $d_{31}$.

Figure 4:
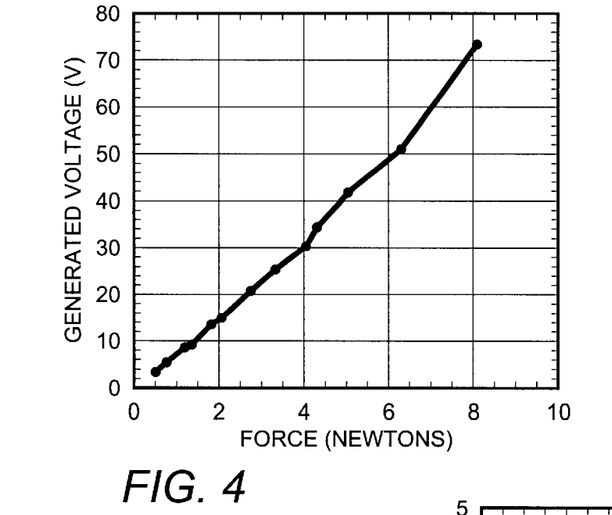
FIG. 4 is a plot of the generated voltage versus force produced by the sensor of FIG. 1.
Figure 5:
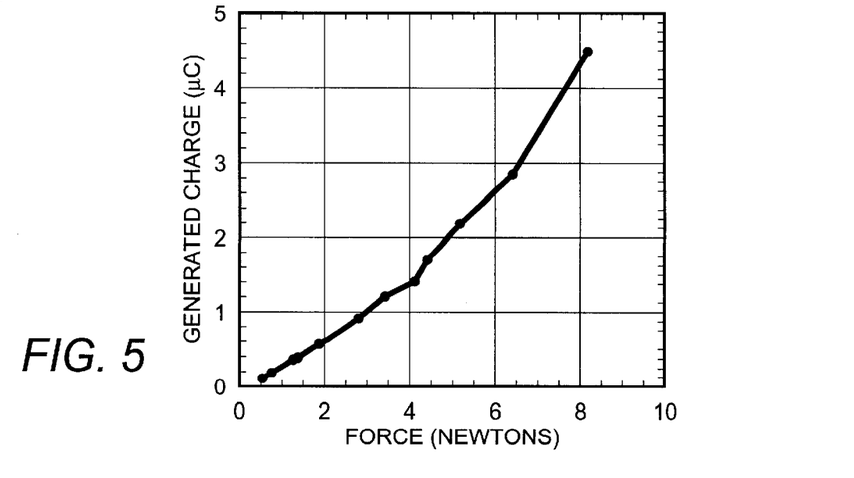
FIG. 5 is a plot of the generated charge versus force produced by the sensor of FIG. 1.

FIG. 4 is a plot of the generated charge (μC) verses force (in Newtons) measured using the sensor described in Table I and illustrated FIGS. 1–3. FIG. 5 is a similar plot of generated voltage "V" (in Volts) verses force F(in Newtons) for the same device. The measurements for generating the plots were taken by supporting one of the amplifiers at its center, placing a weight (corresponding to the force F) on the center of the other amplifier, and measuring the voltage or charge across the electrodes.

Since the piezoelectric plate 102 acts like a spring when displaced, it is possible to apply an external force at a frequency matching the resonant frequency of the sensor. This optimizes the output-to-input ratio.

For a sensor having an effective spring constant $K_{eff}$ coupled to a mass M, the resonant frequency $f_r$ is given by:

$$f_r = (\tfrac{1}{2}I)(K_{eff}/M)^{1/2} \quad \text{(Eq. 5)}$$

The spring constant $K_{eff}$ for the entire device is given by:

$$K_{eff} = \eta K_1/(r/h)^2, \quad \text{(Eq. 6)}$$

where η<1 and accounts for inefficiencies caused by sheering of the bonds, and K, is the spring rate of the plate without the amplifiers. For a Young's elastic modulus Y, and dimensions w, t, and l, $K_1$, is given by:

$$K_1 = Y(wt/l), \quad \text{(Eq. 7)}$$

Additionally, a plurality of sensors may be combined in series or parallel.

Figure 6:
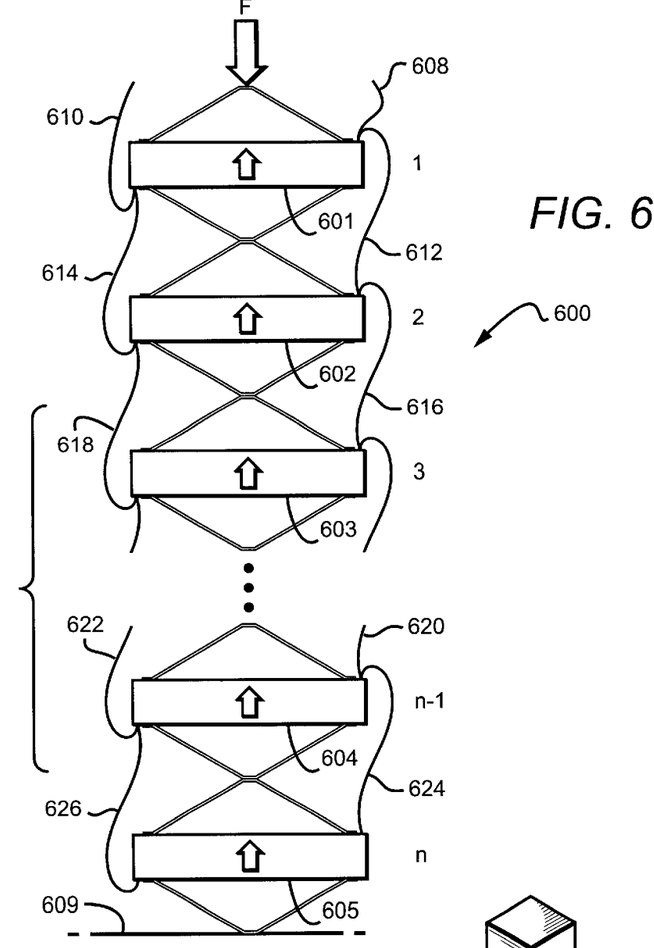
FIG. 6 is a sectional view of a plurality of the sensors of FIG. 1 combined in series.

FIG. 6 illustrates a combination 600 of n sensors 601, 602, 603, 604, 605, each similar to the sensor 100 of FIGS. 1–3, stacked in series and resting on a support surface 609, wherein successive, adjacent amplifiers of the sensors are bonded to each other. An external force F is applied to the top amplifier 601 for generating an output charge. Although the leads 608, 610, 612, 614, 616, 618, 620, 622, 624, 626 of successive amplifiers are illustrated as electrically connecting the sensors in parallel, the sensors may also be connected in series. Additionally, the sensors may be stacked with their polarizations, indicated by the arrows, or with their polarizations in alternating directions.

The stacked sensors have a reduced overall stiffness compared to a single sensor. This increases the output charge to input force ratio.

Figure 7:
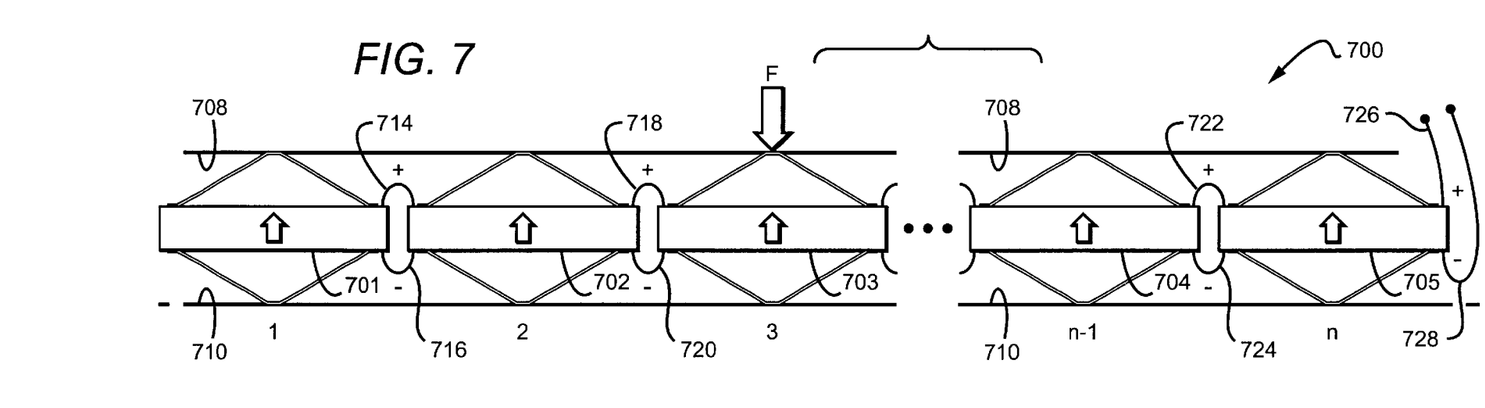
FIG. 7 is a sectional view of a plurality of the sensors of FIG. 1 combined in parallel.

FIG. 7 illustrates a combination 700 of n sensors 701, 702, 703, 704, 705, 706, each similar to the sensor 100 of FIGS. 1–3, combined in parallel. The top amplifiers have a common top surface 708, and the bottom amplifiers rest on a common support surface 710. The sensors 701, 702, 703, 704, 705, 706 are spaced enough apart so that they do not physically interfere with one another as they are stretched.

An external force F is applied to the top surface 708 to generate an output charge. The surfaces 708 and 710 are continuous, but shown broken in the figure to indicate repetition of the illustrated pattern. The leads 714, 716, 718, 720, 722, 724, 726, 728 of adjacent amplifiers are illustrated as electrically connecting the sensors in parallel, but a series connection is also possible. The sensors may be aligned with their polarizations, indicated by the arrows, or with their polarizations in alternating directions.

The parallel combination 700 has increased stiffness compared to a single sensor, thus reducing the tensile stretching and making the sensors less likely to break, but also decreasing the output charge to input force ratio.

Figure 8:
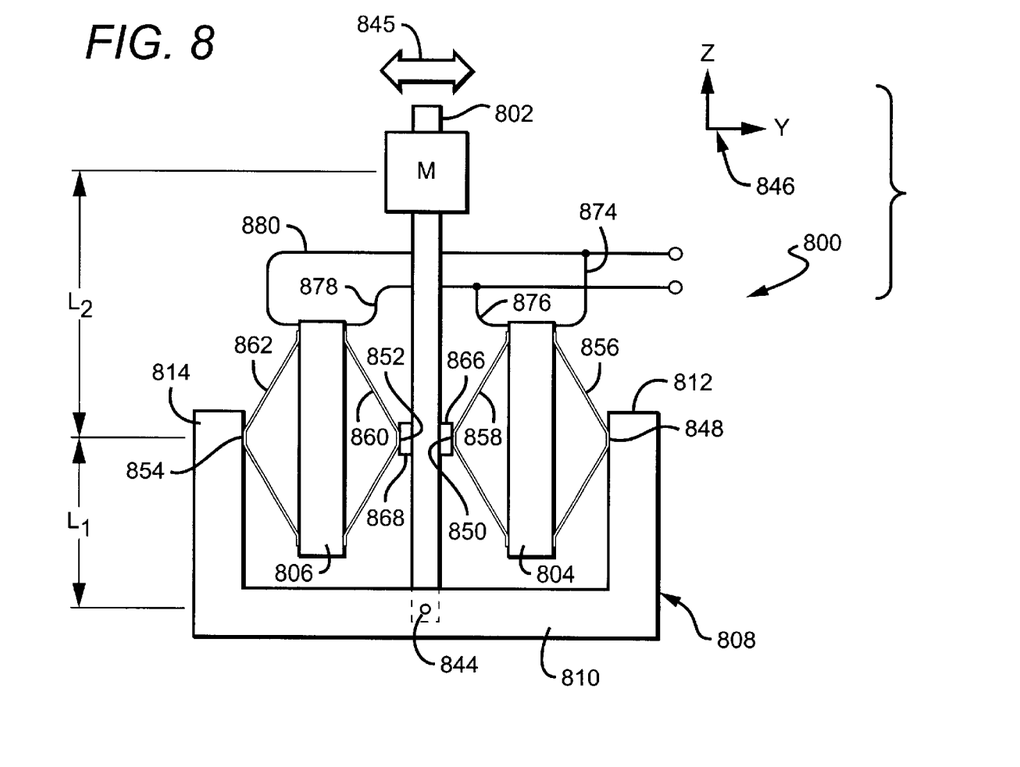
FIG. 8 is a sectional view of a piezoelectric harvester in accordance with the invention.

FIG. 8 illustrates a self contained energy harvester 800 having a lever arm 802 which operates two piezoelectric sensors 804, 806, each similar to the sensor 100 illustrated in FIGS. 1–3, one on either side of the arm 802. A housing 808 retains the lever arm 802 and sensors 804, 806.

Figure 9:
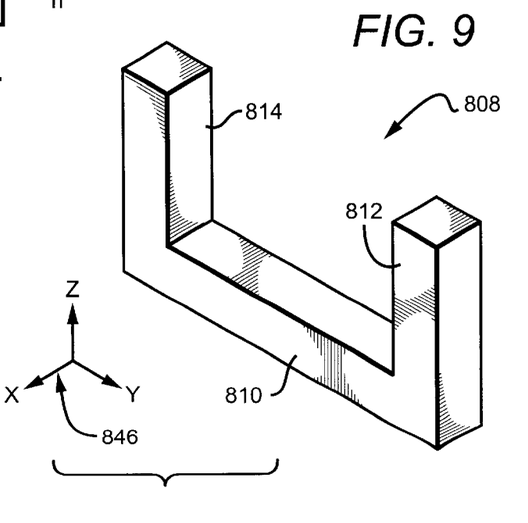
FIG. 9 is a perspective view of the housing used by the harvester of FIG. 8.

According to a preferred embodiment, the housing 808, illustrated separately in FIG. 9, comprises a base 810 and opposite side walls 812, 814 which together form a generally "U" shape.

One end of the lever arm 802 is rotationally hinged (e.g. using a hinge pin 844) at the base 808, between the side walls 812, 814, forming an axis of rotation in the X direction (see reference axis 846), for vibrating latitudinaly in the Y, Z plane against the sensors, as indicated by the double headed arrow 845. The sensors are positioned between respective ones of the two side walls 812, 814 and the lever arm 802, with the centers 848, 850, 852, 854 of their amplifiers 856, 858, 860, 862 at a distance L, from the axis of rotation 844. The amplifiers 856, 862 are bonded at their elevated centers 848, 854 to the inner surfaces of the side walls 812, 814, respectively. In the preferred embodiment, blocks 866, 868, made of a stiff material such as metal or Teflon™, are bonded to the elevated amplifier centers 850, 852 opposite the walls 812, 814 to provide a wider base for receiving the force imparted to the amplifiers. The blocks 866, 868 and lever arm 802 are not bonded to each other, and are preferably positioned to always maintain contact with each other. When the lever arm is exactly centered between the sensors, the pressure applied to the sensors should be as small as possible.

A mass "M" is coupled by the lever arm 802 at a distance $L_1+L_2$ from the axis of rotation 844. The mass is clamped to the lever arm such that it can be removed or repositioned along the length of the arm, making it and the distance $L_2$ adjustable.

The sensor output leads, 874, 876, 878, 880 may be connected to combine the two sensors 804, 806 in parallel, as shown in the figure, or in series, and the polarizations of the plates 804, 806 indicated by the arrows, may be in either aligned or alternating directions.

Each of the sensors 804, 806 may also be replaced by a plurality of sensors, either in series or parallel, as illustrated in FIGS. 6 and 7.

To harvest energy, the harvester 800 is coupled to a device which produces an alternating motion, such as a vibrating motor or a rotating wheel, for driving a vibration of the mass "M" and lever arm 802 with respect to the housing 808. The housing 808 can be vibrated relative to a fixed lever arm 802, the lever arm 802 can be vibrated relative to a fixed housing 808, or both the housing 808 and lever arm 802 can be moved to produce a relative vibration between the lever arm 802 and the sensors 804, 806 in the latitudinal direction 845. This vibration alternately stretches one sensor and compresses the other longitudinally to produce an electrical output. The mechanical energy of the moving component is harvested as an electrical output and stored by a battery or capacitor.

Figure 10:
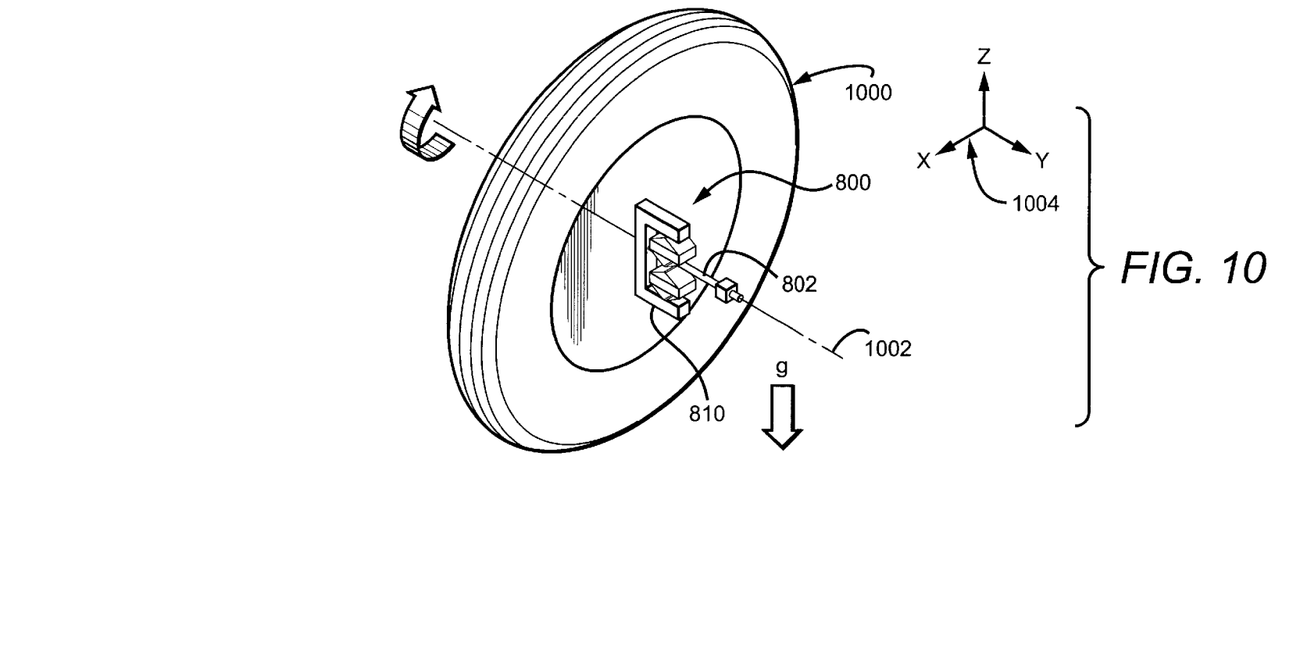
FIG. 10 is a perspective view of the harvester of FIG. 8 coupled to a drive wheel.

FIG. 10 illustrates an example of the harvester 800 with its base bolted to the center of a wheel 1000 having an axis 1002 orthogonal to the Z axis (see reference axis 1004). Gravity "g" acting on the mass "M" in the Z direction, drives a vibration of the lever arm 802 as the wheel 1000 rotates. It is preferable to locate the lever arm 802 and mass "M" along the axis 1002 to balance the centripetal forces acting on the mass.

The harvested energy can be used for many purposes such as recharging batteries. The harvester is especially suited for a wireless integrated network systems (WINS), wherein the harvested energy is used to transmit a radio frequency signal for monitoring industrial and other machinery.

In addition to harvesting energy, the harvester 800 can be used to directly determine the rotational speed of a wheel, or the vibrational frequency of a motor, based upon the vibrational frequency of the lever arm 802 relative to the housing.

The position of the mass M and thus the length $L_2$, can be adjusted, making it possible for the harvester 800 to also be used to detect a change in vibration. This is accomplished by setting the mass position so that the lever arm resonates at the frequency of interest, and then monitoring the harvester to determine whether or not it is in resonance. This application is well suited for wireless monitoring of industrial machinery, since the harvested energy can be used to send a radio frequency signal when the lever arm is vibrating at the resonant frequency.

Using eq. 5, the resonant frequency $f_r$ for the harvester 600, is given by:

$$f_r \cong \tfrac{1}{2}\pi\beta(K/M)^{1/2} \quad \text{(Eq. 8)}$$

where M is the mass coupled to the lever arm and K is the sum of the effective spring constants $K_{eff}$ for the sensors:

$$K = K_{eff1} + K_{eff2}$$

$K_{eff1}$ and $K_{eff2}$ are determined according to eqs. 6 and 7, for each sensor. $\beta$ is the lever arm gain, given by:

$$\beta = (L_1 + L_2)/L_2 \quad \text{(Eq. 9)}$$

Figure 11:
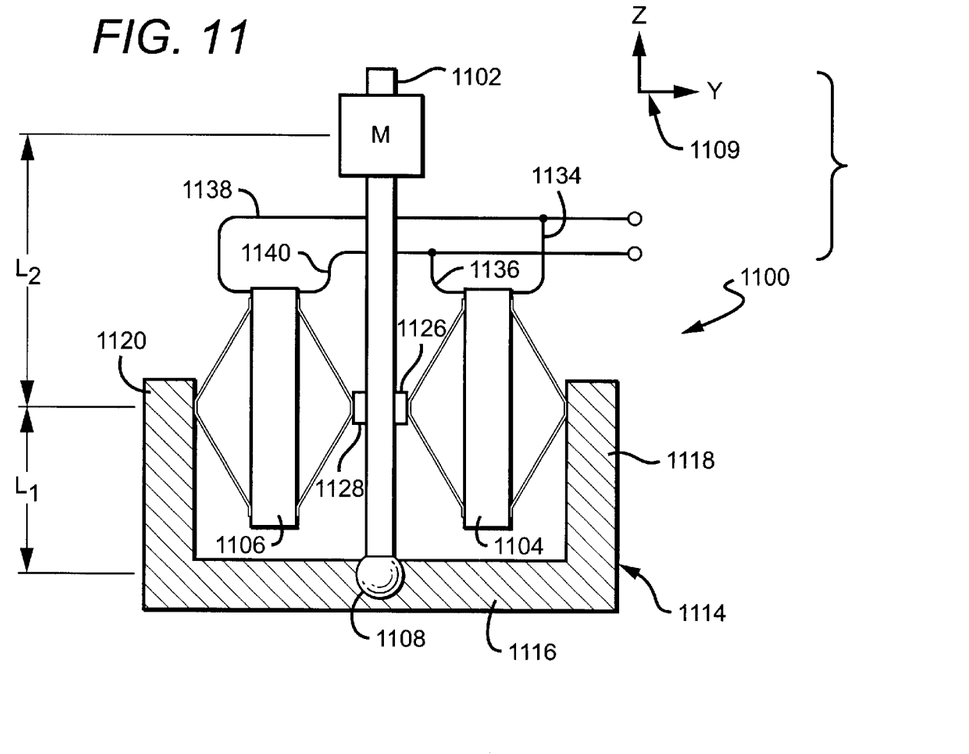
FIG. 11 is a sectional view of another embodiment of a piezoelectric harvester in accordance with the invention.
Figure 12:
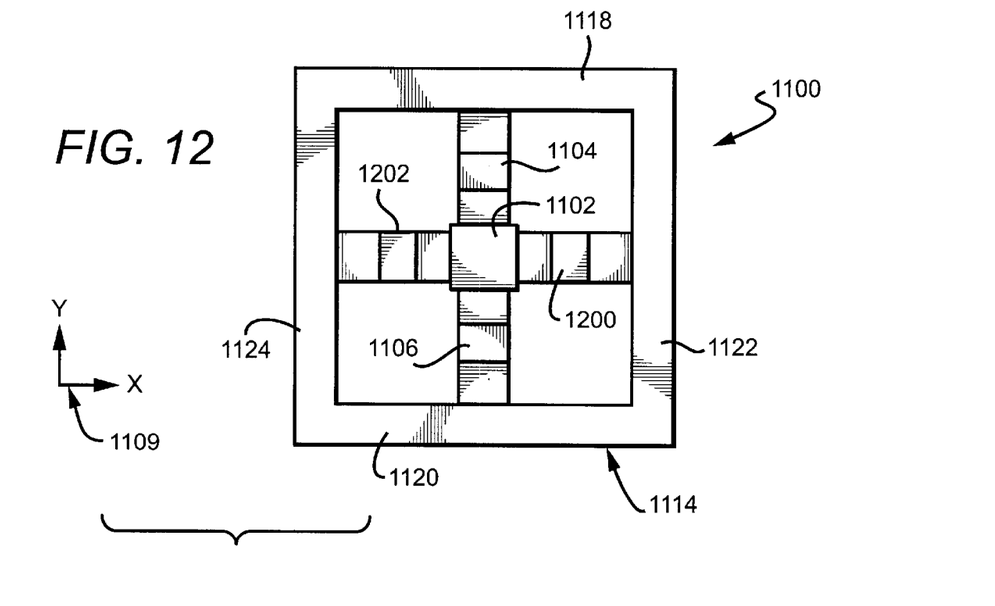
FIG. 12 is a plan of the harvester of FIG. 11.

Many variations of an energy harvester which combine at least one piezoelectric sensor with a lever arm are possible. For example, illustrated in FIGS. 11 and 12 is an energy harvester 1100, similar to the harvester 800 illustrated in FIG. 8, but having a lever arm 1102 surrounded by four sensors 1104, 1106, 1200, 1202, each similar to the sensor 100 illustrated in FIGS. 1 and 2. The lever arm has a ball socket 1108 instead of a hinge so that it vibrates both latitudinally in the Y,Z plane and longitudinally in the X,Z plane (see reference axis 1109), respectively, against all four sensors.

The housing 1114 has a square base 1116 and four side walls 1118, 1120, 1122, 1124 for retaining the sensors 1104, 1106, 1200, 1202.

Similar to the harvester 800 illustrated in FIG. 8, each sensor is positioned between one of the four side walls 1118, 1120, 1122, 1124 and the lever arm 1102, with one of the elevated centers of each sensor's amplifiers bonded to a side wall at a distance $L_1$ from base 1116. In the preferred embodiment, blocks 1126, 1128, 1130, 1132 are bonded to the elevated centers of the amplifiers 1104, 1106, 1200, 1202 opposite the walls 1118, 1120, 1122, 1124, respectively. The blocks 1126, 1128, 1130, 1132 and lever arm 1102 are not bonded to each other, and are preferably positioned as close as possible but without pressing against each other.

A mass "M" is coupled to the lever arm 1102 at a distance $L_1+L_2$ from the base 1116 with its position along the lever arm being adjustable. Output leads, 1134 and 1136, 1138 and 1140, 1142 and 1144, 1146 and 1148, from sensors 1104, 1106, 1200 and 1202, respectively, may be connected to combine the four sensors into a single circuit.

Each of the sensors may also be replaced by a plurality of sensors, either in series or parallel as illustrated in FIGS. 6 and 7.

As with the harvester 800, the harvester 1100 produces an electrical output in response to movement of the lever arm 1102 relative to the housing 1114, but in this case an electrical output is produced from all movement of the lever arm in the X-Y plane.

Figure 13:
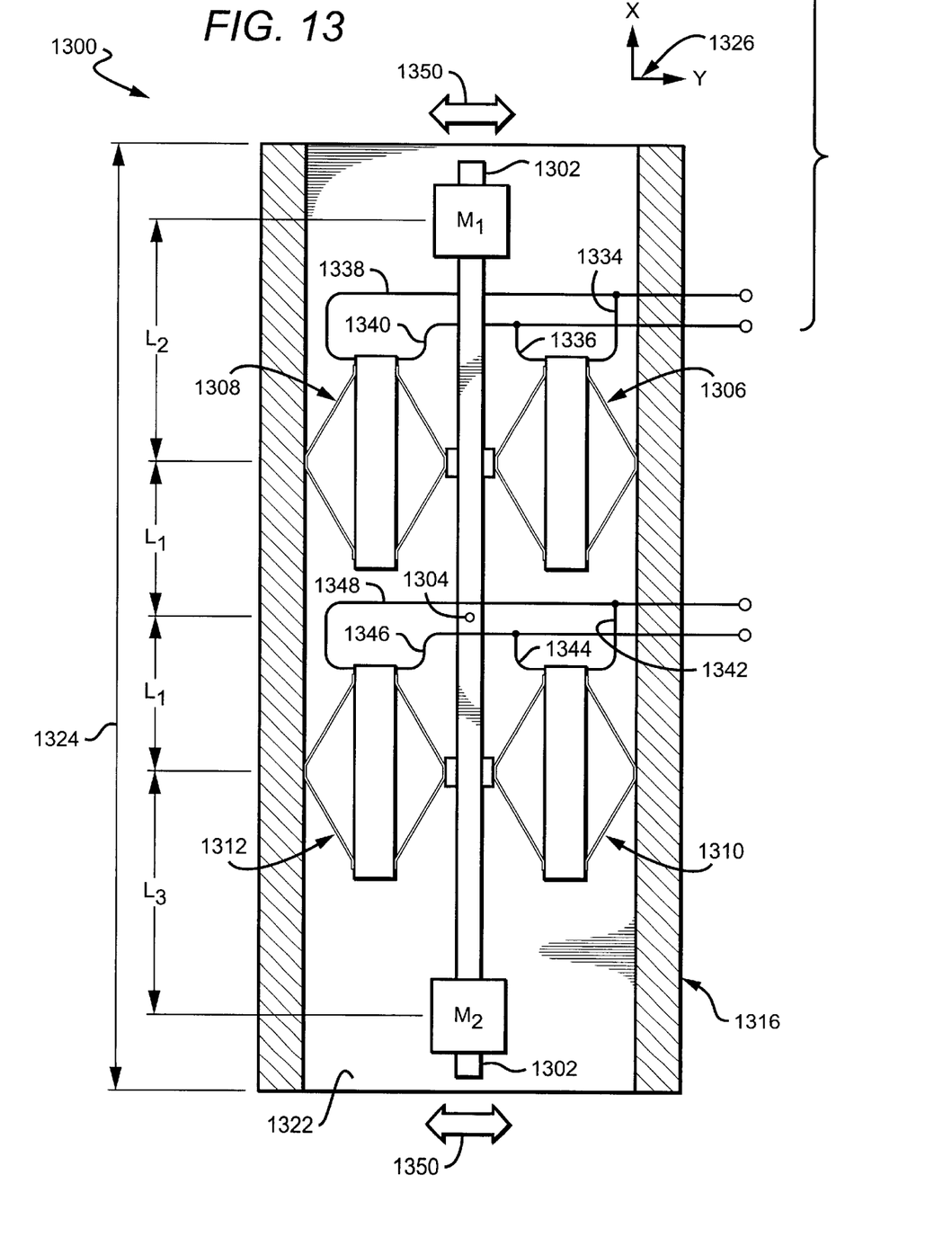
FIG. 13 is a sectional view of a third piezoelectric harvester embodiment in accordance with the invention.

FIG. 13 illustrates a harvester 1300, similar to the harvester 800 illustrated in FIG. 8, having a lever arm 1302 rotationally hinged at its center 1304, instead of at its end, and contacting two pairs of sensors 1306, 1308 and 1310, 1312. Each pair of sensors is located at a distance $L_1$ from the center 1304. The harvester 1300 further comprises a housing 1316 for retaining the sensors 1306, 1308, 1310, 1312 and arm 1302.

Figure 14:
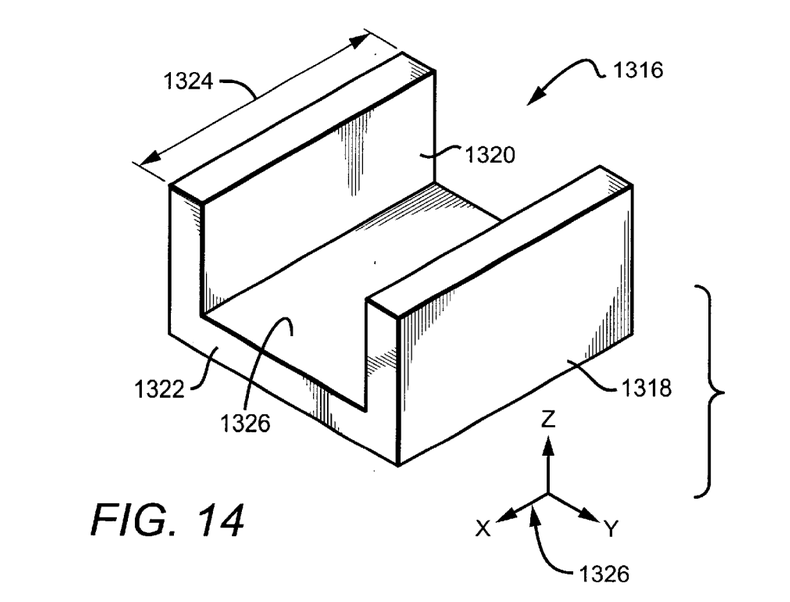
FIG. 14 is a perspective view for the housing for the harvester of FIG. 13.

The housing 1316, illustrated separately in FIG. 14, comprises two side walls 1318, 1320, and a base 1322. This is similar to the housing 808 of the harvester 800, but has a longer base 1322 for retaining the lever arm 1302 and sensors 1306, 1308, 1310, 1312 along the length 1324 of the base 1322.

The lever arm 1302 is supported on an axis, parallel to the Z axis (see reference axis 1326) which is coupled to the inner bottom surface 1326 of the base 1322 approximately at the center of the base 1322.

Masses "$M_1$" and "$M_2$" are coupled to opposite ends of the lever arm 1302, at distances $L_1+L_2$ and $L_1+L_3$ from the center 1304, respectively, for driving the vibration. The position of the masses along the lever arm is adjustable.

Output leads, 1334 and 1336, 1338 and 1340, 1342 and 1344, 1346 and 1348 from sensors 1306, 1308, 1310, 1312, respectively, may be connected to combine the four sensors into a single circuit.

Each of the sensors 1306, 1308, 1310, 1312 may also be replaced by a plurality of sensors either in series or parallel as illustrated in FIGS. 6 and 7.

The harvester 1300 is coupled to a vibrating component of an external machinery, such that the vibration of the component causes a latitudinal vibration of the lever arm in the X, Y plane, indicated by arrows 1350 in FIG. 13.

Besides using a lever arm, there are many ways of coupling a mass to a sensor. FIGS. 15–18 illustrate an energy harvester 1500, having a mass unit 1502, coupled between two sensors 1504, 1506, for moving back and forth against the sensors 1504, 1506.

Figures 15, 18, 19:
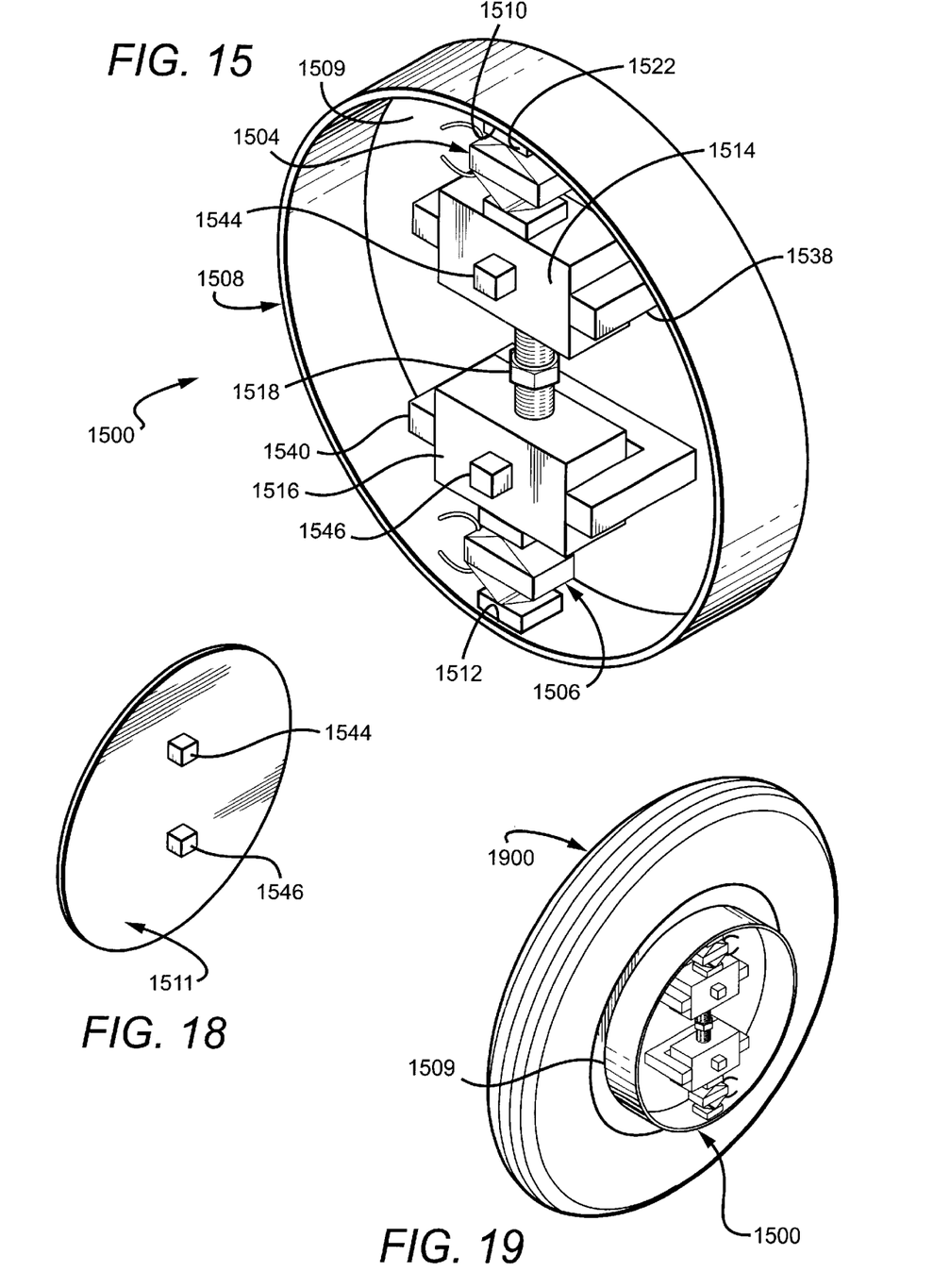
FIG. 15 is a perspective view of a fourth piezoelectric harvester embodiment in accordance with the invention.
FIG. 18 is a perspective view of a cover for the harvester of FIG. 15.
FIG. 19 is a perspective view of the harvester of FIG. 15 coupled to the axle of a drive wheel.
Figure 16:
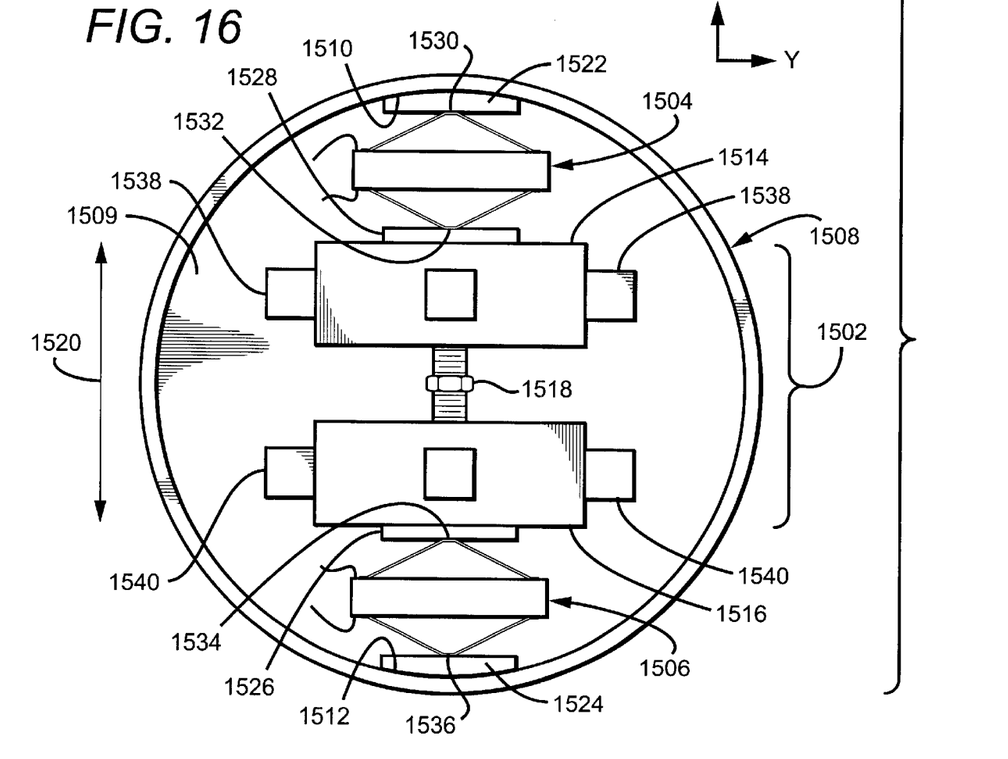
FIG. 16 is an elevation view of the harvester of FIG. 15.

The harvester 1500 is preferably housed in a cylinder 1508, having a base 1509 and a removable top cover 1511, such that the mass unit 1502 and sensors 1504, 1506 are retained between the base 1509 and cover 1511, and opposing inner surfaces 1510, 1512 of the cylinder wall, along the diameter. FIG. 15 illustrates the cover 1511 as being transparent.

The mass unit 1502 comprises two masses 1514, 1516 connected by a double screw 1518. The masses 1514, 1516 have opposite threading for connecting to the screw 1518, such that the length 1520 of the unit 1502 can be adjusted by twisting the screw 1418.

In the preferred embodiment, blocks 1522, 1524, 1526, 1528, made of a stiff material such as metal or Teflon™, are bonded to the elevated centers 1530, 1532, 1534, 1536 of the sensors 1504, 1506 to create a wider and flat base for receiving a force. Two of the blocks 1522 and 1524 are bonded to opposing inner surfaces 1510, 1512 of the cylinder wall, and the other two blocks 1526, 1528 are bonded to the two masses 1514, 1516, opposite the sensors 1504, 1506. Thus, the mass unit 1502 is retained between the sensors 1504, 1506, and each of the sensors 1504, 1506 is retained between the wall of the cylinder and the mass unit 1502, along the diameter of the cylinder 1508.

Figure 17:
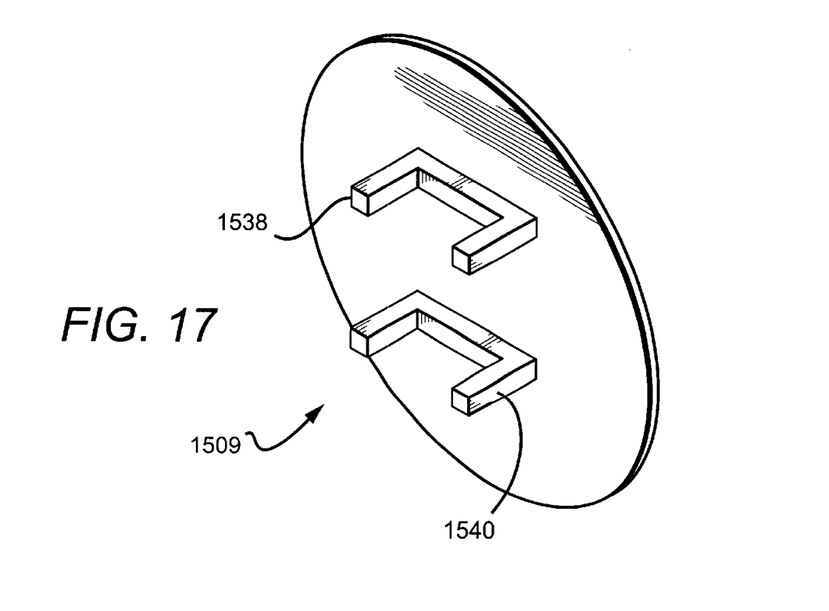
FIG. 17 is a perspective view of a base for the harvester of FIG. 15.

Brackets 1538, 1540, illustrated separately in FIG. 17, are attached to the base 1509 for retaining the masses. The brackets 1538, 1540 are made of a smooth material such as Teflon™ for providing a frictionless surface which allows the masses 1514, 1516 to slide along the Z axis (see reference axis 1542), and against the sensors 1504, 1506. The brackets also keep the masses 1504, 1506 from moving sideways in the Y direction.

The masses 1504, 1506 are preferably made of a smooth and dense material such as metal. Although the masses 1504, 1506 are illustrated as square blocks, they may be in any shape convenient for housing within the cylinder 1508.

Retaining blocks 1544, 1546 are attached to the top cover 1511 (illustrated separately in FIG. 18), for preventing the masses 1514, 1516 from moving in the X direction. The retaining blocks 1544, 1546 are positioned directly above the brackets 1538, 1540 when the cylinder is enclosed by the cover 1511. The retaining blocks 1544, 1546 are also made of a smooth material such as Teflon for allowing the masses to slide freely in the Z direction.

Thus, the masses 1514, 1516 are held in place between the retaining blocks 1544, 1546 and brackets 1538, 1540 such that they can only slide back and forth in the Z direction, against the sensors 1504, 1506. Additionally, the sensors 1504, 1506, mass unit 1502, brackets 1538, 1540, retaining blocks 1544, 1546, and other components of the harvester 1500 are aligned and centered about a diameter of the cylinder 1508.

Each of the sensors 1504, 1506 may also be replaced by a plurality of sensors either in series or parallel as illustrated in FIGS. 6 and 7.

Before operating the harvester 1500, the length of the mass unit 1502 is adjusted by twisting the screw 1518 such that the masses 1514, 1516 just contact the sensors 1504, 1506, such that the pressure applied to the sensors when the mass is exactly centered between the sensors is as small as possible. Additionally, the top cover 1511 is locked in place to enclose the cylinder 1508.

The cylindrical housing of the harvester 1500 make it well suited for bolting onto the wheel of a vehicle for harvesting energy. As illustrated in FIG. 19, the harvester 1500 is bolted at its base 1509 to the face of the wheel 1900. To balance the centripetal forces, the harvester 1500 is bolted to the center of the wheel 1900. It is also noted that the harvester is fully self contained, and does not require any additional non-rotating parts.

Figure 20:
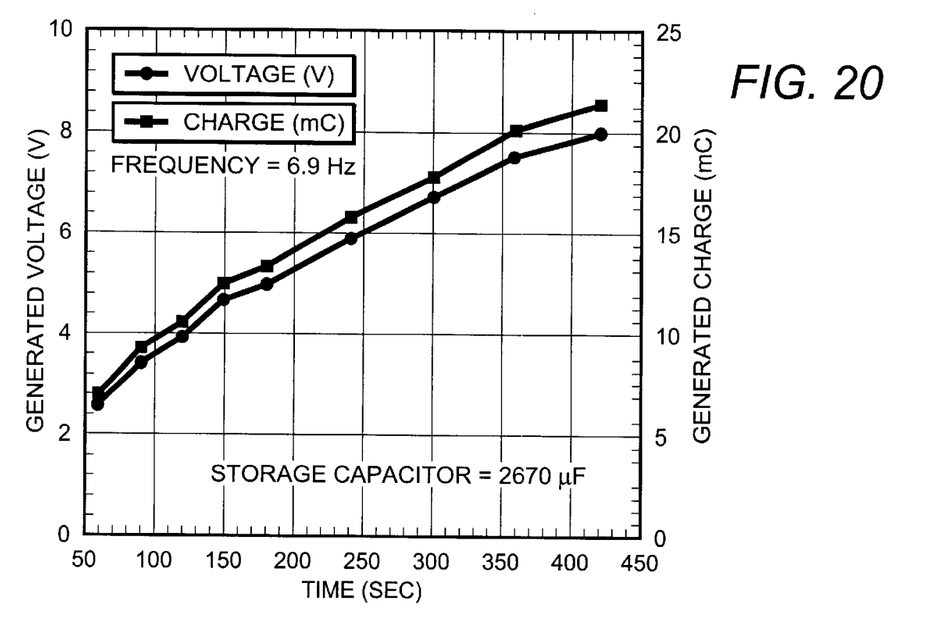
FIG. 20 is a plot of the generated voltage and charge versus time produced by the harvester of FIG. 15.

FIG. 20 is a plot of the voltage and charge generated versus time, using a harvester as in FIGS. 14–19, having two similar sensors as described in Table I. To generate the plot, the harvester was bolted to the center of a wheel having a frequency of 6.9 Hz, which is approximately the rotational frequency for the wheel of a truck traveling at 40 miles per hour. The generated energy was stored using a 2670 $\mu$F storage capacitor. The weight of the mass unit which included the two masses and screw was 792 grams.

Figure 21:
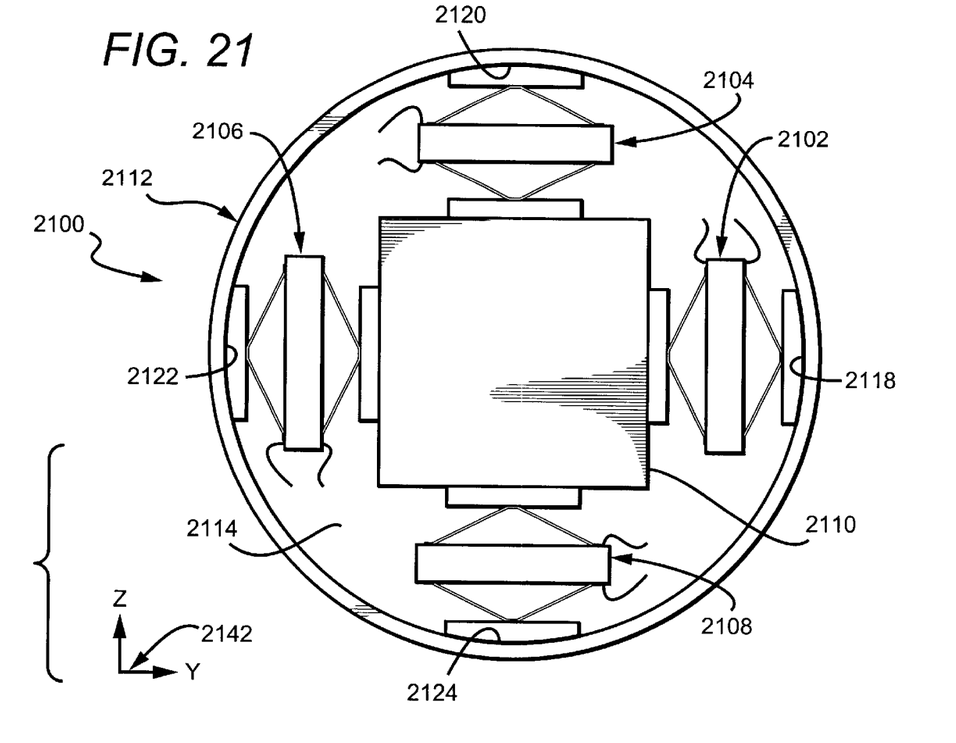
FIG. 21 is a sectional view of another piezoelectric harvester embodiment in accordance with the invention.
Figure 22:
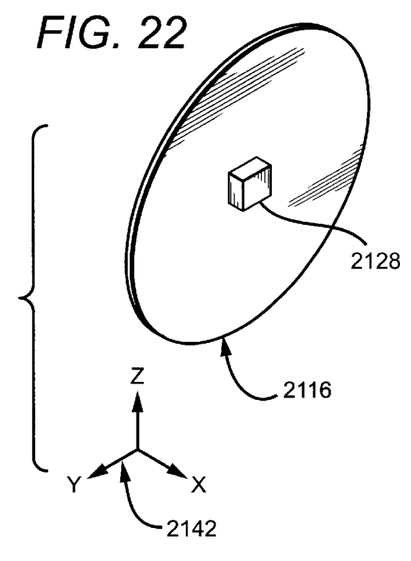
FIG. 22 is a perspective view of a cover for the harvester of FIG. 21.
Figure 23:
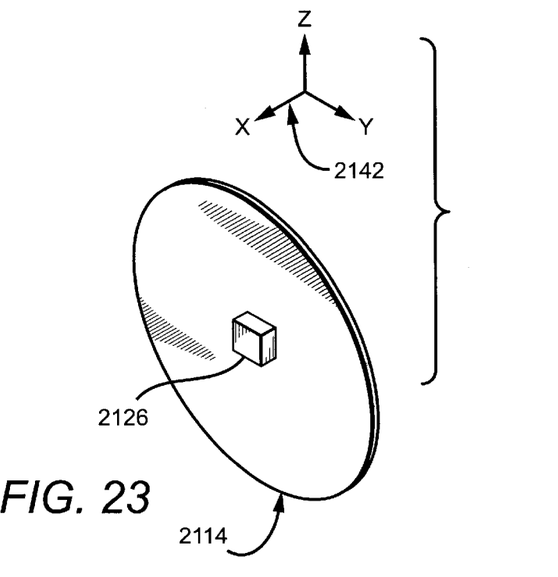
FIG. 23 is a perspective view of a base for the harvester of FIG. 21.

FIGS. 21–23 illustrates a harvester, 2100 similar to the harvester illustrated in FIGS. 15–19, but having a mass 2110 coupled between four sensors 2102, 2104, 2106, 2108, instead of two.

The harvester 2100 is preferably housed in a cylinder 2112, having a base 2114 and a removable top cover 2116, such that the mass 2110 and sensors 2102, 2104, 2106, 2108 are retained between the base 2114 and cover 2116 and opposing inner surfaces 2118, 2120, 2122, 2124 of the cylinder wall. FIG. 21 illustrates the harvester 2100 without the cover 2116.

Retaining blocks 2126, 2128, illustrated separately in FIGS. 22 and 23 are attached to the center of the base 2114 and center of the top cover 2116 for retaining the mass. The blocks 2126, 2128 are made of a smooth material such as Teflon™ for providing a frictionless surface which allows the mass to slide within the Z,Y plane (see reference axis 2142), and against the sensors 2102, 2104, 2106, 2108. Thus, the mass 2110 is held in place between the retaining blocks 2126, 2128 such that it can only slide from side to side in the Z,Y plane, against the sensors 2102, 2104, 2106, 2108. The mass 2110 is preferably made of a smooth and dense material such as metal.

Each of the sensors 2102, 2104, 2106, 2108 may also be replaced by a plurality of sensors either in series or parallel as illustrated in FIGS. 6 and 7.

Before operating the harvester 2100, the top cover 2116 is locked in place to enclose the cylinder.

Figure 24:
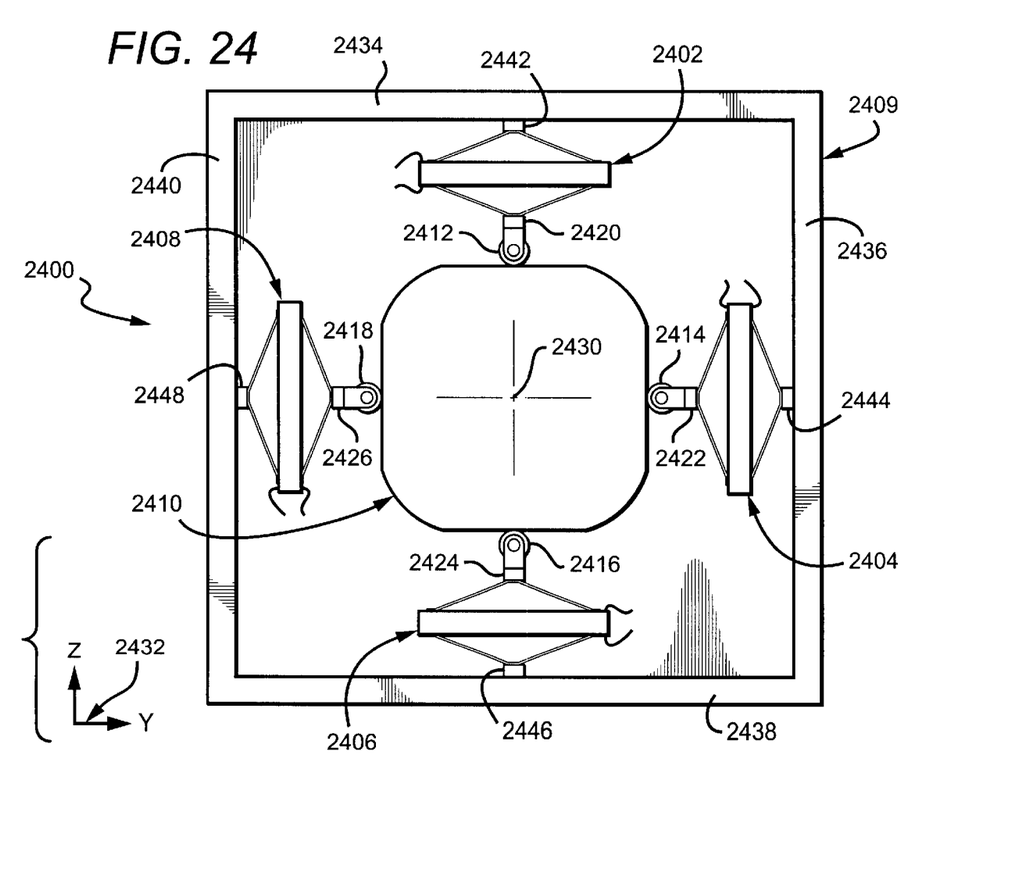
FIG. 24 is a sectional view of another piezoelectric harvester embodiment in accordance with the invention.

FIG. 24 illustrates a harvester 2400, having a rotating shaft 2410 coupled to four sensors 2402, 2404, 2406, 2408, and a housing 2409 for containing the sensors and shaft. The shaft has a rotational axis 2430 in the X direction (see reference axis 2432), and is centered about the sensors. The sensors 2402, 2404, 2406, 2408 are retained between the walls 2434, 2436, 2438, 2440 of the housing 2409 and shaft 2410. Wheels 2412, 2414, 2416, 2418 are coupled to the elevated centers 2420, 2422, 2424, 2426 of the sensors 2402, 2404, 2406, 2408 facing the shaft 2410. The wheels 2412, 2414, 2416, 2418 contact the shaft 2410 and rotate in the opposite direction of the shaft, such that the shaft can rotate smoothly against the sensors.

The shaft 2410 has an octagonal geometry so that its bulging sides apply a pulsating force orthogonal to the plates of the sensors 2402, 2404, 2406, 2408 as it rotates against the sensors 2402, 2404, 2406, 2408.

The walls 2434, 2436, 2438, 2440 of the housing 2409 retain the sensors 2402, 2404, 2406, 2408 on the side opposite the shaft 2410. The non bulging sides of the shaft contact the wheels without applying pressure on the sensors. Blocks 2442, 2444, 2446, 2448 may be bonded between the sensors 2402, 2404, 2406, 2408 and walls 2434, 2436, 2438, 2440 to adjust the distance between the shaft 2410 and sensors 2402, 2404, 2406, 2408.

Each of the sensors 2402, 2404, 2406, 2408 may also be replaced by a plurality of sensors either in series or parallel as illustrated in FIGS. 6 and 7.

The harvester 2400 may be harder to implement because it requires a rotating shaft. The harvester 2400 can be coupled to the shaft of a wheel of a vehicle for example, however this requires the shaft to be shaped in a specific way, and for the harvester to be coupled to a non rotating part of the vehicle as well as the shaft, so that the four sensors are stationary with respect to the rotating shaft.

While specific examples of the invention have been shown and described, numerous variations and alternate embodiments will occur to those skilled in the art. Accordingly, it is intended that the invention be limited only in terms of the appended claims.

We claim:

1. An energy harvesting device comprising:
    a sensor, comprising:
        a piezoelectric body having a longitudinal direction; and
        a force amplifier connected to translate an applied force perpendicular to the longitudinal direction to a tensile stress of said body parallel to its longitudinal direction, thereby inducing said body to generate a voltage; and
    a reciprocable mass disposed to apply a force, having at least a component that is perpendicular to said longitudinal direction, to said force amplifier.

2. The energy harvesting device of claim 1, wherein said piezoelectric body comprises a plate having major top and bottom opposite surfaces, and said tensile stress is parallel to said surfaces.

3. The energy harvesting device of claim 2, further comprising sheet electrodes on said plate's major surfaces which cover substantially the entire surfaces, said force amplifier being connected to opposite ends of at least one of said electrodes.

4. The energy harvesting device of claim 2, wherein said force amplifier comprises a translation member having an elevated center and opposite ends that are coupled to said plate to apply said tensile stress in response to a force applied to the center perpendicular to the plate.

5. The energy harvester device of claim 4, further comprising sheet electrodes on said plate's major surfaces wherein said translation member is coupled to said plate through one of said electrodes.

6. The energy harvesting device of claim 4, said force amplifier being disposed on one side of said plate, further comprising a second force amplifier coupled to said plate on the plate's opposite side.

7. The energy. harvesting device of claim 1, further comprising a plurality of said sensors arranged in series for receiving said force.

8. The energy harvesting device of claim 1, further comprising a plurality of said sensors arranged in parallel for receiving said force.

9. The energy harvesting device of claim 1, wherein said mass applies said force to said force amplifier in response to relative movement between said mass and said sensor.

10. The energy harvesting device of claim 1, wherein said piezoelectric body is monolithic and uniform.

11. The energy harvesting device of claim 1, further comprising a housing which retains said sensor and mass.

12. The energy harvesting device of claim 11, wherein alternating motion of said housing causes said mass to apply said force to said force amplifiers.

13. The energy harvesting device of claim 1, further comprising at least one additional sensor wherein said mass is positioned between said sensors to apply a force to said sensors alternately when said mass reciprocates.

14. The energy harvesting device of claim 13, wherein said sensors are coaxial.

15. The energy harvesting device of claim 13, further comprising a housing wherein said mass reciprocates between opposed force amplifiers of said sensors, and said housing is rotatable to cause said mass to reciprocate between said force amplifiers.

16. The energy harvesting device of claim 13, comprising two pairs of said sensors, with the sensors of each pair positioned on opposite sides of said mass along an axis that is angled to the axis of the other pair, and said mass is retained by said housing to reciprocate along both of said axes.

17. The energy harvesting device of claim 1, further comprising at least one additional sensor wherein said mass is held by a carrier that is positioned between said sensors to apply a force to said sensors alternately when said mass reciprocates.

18. The energy harvesting device of claim 17, said carrier comprising a lever arm that reciprocates between said sensors and carries said mass.

19. The energy harvesting device of claim 18, wherein the position of said mass along said lever arm is adjustable to adjust the resonant frequency of the lever arm.

20. The energy harvesting device of claim 18, further comprising a housing, wherein said housing is rotatable to cause said lever arm to reciprocate between said force amplifiers.

21. The energy harvesting device of claim 18, comprising first and second pairs of said sensors, wherein said lever arm rotates about an axis that is approximately centrally located between said first and second pairs, such that the lever arm imparts an alternating force to the sensors of each pair.

22. The energy harvesting device of claim 18, comprising two pairs of said sensors, with the sensors of each pair positioned on opposite sides of said lever arm along an axis that is angled to the axis of the other pair, and said lever arm reciprocates along both of said axes.

23. An energy harvesting device comprising:
    a sensor, comprising:
        a piezoelectric body having a longitudinal direction; and
        a force amplifier connected to translate an applied force perpendicular to the longitudinal direction to a tensile stress of said body parallel to its longitudinal direction, thereby inducing said body to generate a voltage; and
    a lever arm disposed to apply a force, having at least a component that is perpendicular to said longitudinal direction, to said force amplifier.

24. An energy harvesting device comprising:
    a sensor, comprising:
        a piezoelectric body having a longitudinal direction; and
        a force amplifier connected to translate an applied force perpendicular to the longitudinal direction to a tensile stress of said body parallel to its longitudinal direction, thereby inducing said body to generate a voltage; and
    a rotating shaft disposed to apply a force, having at least a component that is perpendicular to said longitudinal direction, to said force amplifier.

25. The energy harvesting device of clam 24, further comprising at least one additional sensor, wherein said shaft is positioned between the sensors to apply a force to the sensors when the shaft rotates.

26. The energy harvesting device of claim 24, wherein said shaft applies a pulsating force to said force amplifier.

27. The energy harvesting device of claim 26, wherein said shaft has an octagonal geometry for imparting said pulsating force.

28. The energy harvesting device of claim 27, comprising four of said sensors surrounding said shaft, such that said shaft is centered about said sensors.

29. An energy generating system comprising:
- a machine including a component having a motion;
- an energy harvesting device mechanically coupled to said component for harvesting its motion to create electrical energy, said energy harvesting device comprising:
  - at least one sensor, said sensor comprising:
    - a piezoelectric body having a longitudinal direction; and
    - a force amplifier connected to translate an applied force perpendicular to the longitudinal direction to a tensile stress of said body parallel to its longitudinal direction, thereby inducing said body to generate a voltage;
  - a reciprocable mass disposed to apply a force, having at least a component that is perpendicular to said longitudinal direction, to said force amplifier; and
  - a housing mechanically coupled to said component of the machine, for retaining said mass and sensor, wherein said motion of said component causes the mass to impart said force.

30. The energy generating system of claim 29, wherein said component is capable of alternating motion, wherein said alternating motion is harvested by said energy harvesting device.

31. The energy generating system of claim 30, wherein said alternating motion is rotational.

32. The energy generating system of claim 29, wherein said electrical energy is utilized by the machine.

33. The energy generating system of claim 29, wherein said electrical energy is used to send a radio frequency signal.

34. The energy generating system of claim 33, wherein said radio frequency signal is used to indicate the operating status of said machine.

35. The energy generating system of claim 29, wherein said mass and sensor are in relative motion with respect to each other, said relative motion being caused by the motion of said component.

36. An energy generating system comprising:
- a machine including a component capable of reciprocating motion;
- an energy harvesting device mechanically coupled to said component for harvesting its reciprocating motion to create electrical energy and for detecting the frequency of said motion, said energy harvesting device comprising:
  - at least one sensor, said sensor comprising:
    - a piezoelectric body having a longitudinal direction; and
    - a force amplifier connected to translate an applied force perpendicular to the longitudinal direction to a tensile stress of said body parallel to its longitudinal direction, thereby inducing said body to generate a voltage;
  - a reciprocable mass disposed to apply a force, having at least a component that is perpendicular to said longitudinal direction, to said force amplifier; and
  - a housing mechanically coupled to said component of the machine, for retaining said mass and sensor, wherein said motion of said component causes the mass to impart said force.

37. The energy generating system of claim 36, wherein said mass is held by a lever arm.

38. The energy generating system of claim 37, wherein said electrical energy is used to send a radio frequency signal to indicate the operating status of said machine.

* * * * *